Oct. 15, 1968     J. J. SMITH     3,405,739
RETRACTABLE STEEL WEDGE STOPPER AND
METHOD OF USING THE SAME
Filed June 27, 1966     2 Sheets-Sheet 1
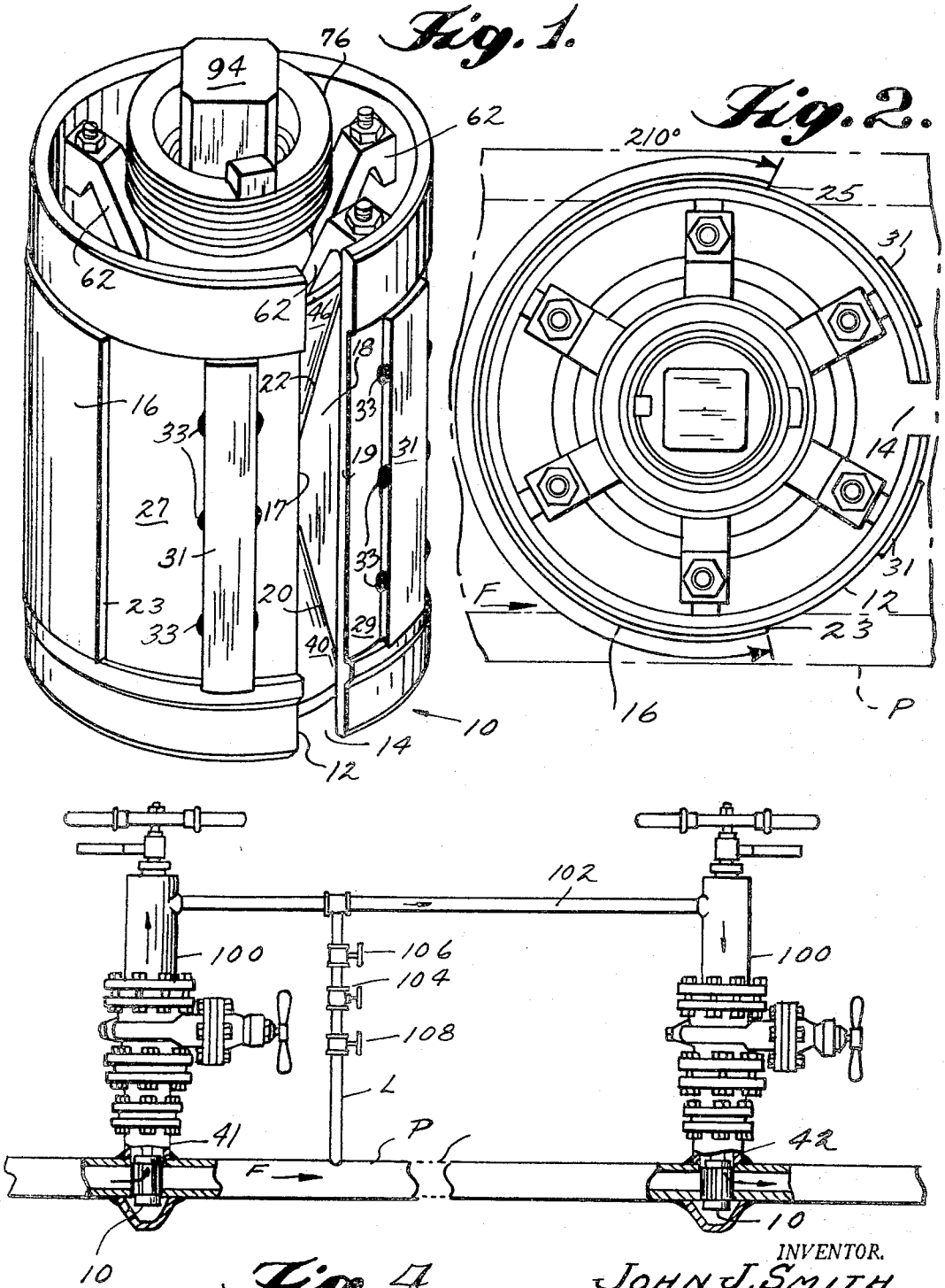
INVENTOR.
JOHN J. SMITH
BY
Cushman, Darby & Cushman
ATTORNEYS

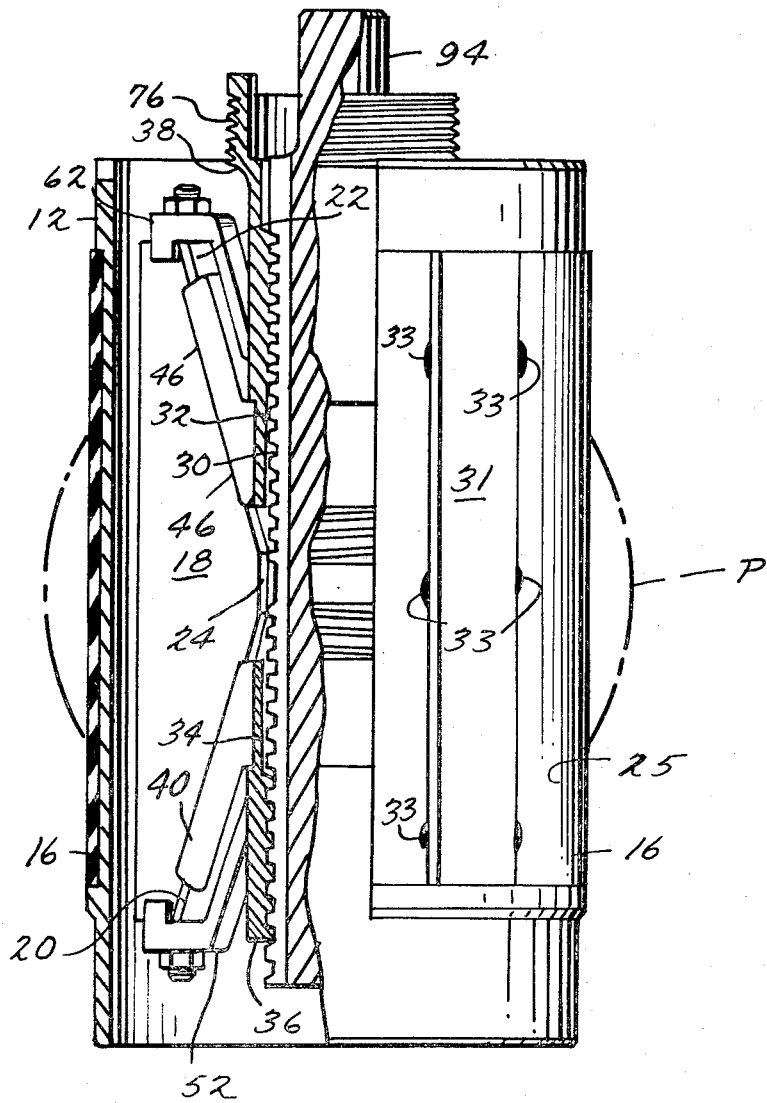

United States Patent Office 3,405,739
Patented Oct. 15, 1968

3,405,739
RETRACTABLE STEEL WEDGE STOPPER AND
METHOD OF USING THE SAME
John J. Smith, Decatur, Ill., assignor to Mueller Co.,
Decatur, Ill., a corporation of Illinois
Filed June 27, 1966, Ser. No. 560,585
8 Claims. (Cl. 138—97)

The present invention relates to pipe line stoppers of the longitudinally split expanding sleeve type adapted to be fitted in a transverse circular cutout portion of a pipe and radially expanded to stop the flow of fluid through the pipe as well as a method of utilizing such stoppers when bypassing a section of pipe to be replaced or repaired without interruption of service. More specifically, the present invention relates to improvements in expandable sleeve pipe line stopper assemblies of the type disclosed in my United States Patent 3,130,951, issued Apr. 28, 1964.

Prior art pipe stoppers of the general character disclosed in the aforementioned United States patent include means operative to positively contact as well as to positively expand the stopper when used with what is known in the trade as "stopping machines." While these prior art pipe line stopper assemblies have proved quite satisfactory with respect to the mechanism for positively expanding or contracting the same, they have had shortcomings in use in that their sealing surfaces have been damaged by the edge cutout portion of the pipe during insertion and removal from the opening in the pipe line. In large pipe lines where the fluid pressures encountered are in the order of 300 to 1,000 p.s.i., the longitudinally-split stopper assemblies have been used to isolate a section of the pipe line which needs repair or replacement. Once the stopper assemblies have been positioned in the pipe line, it is customary when using these stopper assemblies with the "stopping machines" to bypass the fluid through the upstream stopper assembly into the stopping machines and the bypass line therebetween and out through the downstream stopper assembly. However, since the stopper assemblies must be inserted into the pipe line which has a fast flow of fluid at high pressure, the stopper assemblies have a tendency to be urged against the cutout edges of the transverse opening in the pipe on their downstream side. These stopper assemblies, since they are provided with a flexible cover of gasket material for making the seal oftentimes have the cover damaged during either the insertion or removal from the pipe line. This necessitates either replacing the stopper assembly or repairing the same by applying a new cover thereto and in both instances the cost of repair or replacement is high. Additionally, the stopper assemblies have their flexible cover of gasket material damaged during insertion without the operator being aware of the condition or the fact they have not made a proper seal. Thus, a dangerous situation exists during the operation when actual repair or replacement of the section of pipe is made.

Accordingly, an important object of the present invention is to provide an improved pipe line stopper and, more particularly, an improved expandable and retractable longitudinally split cylindrical sleeve for such a stopper which will not be damaged by the cut edges of the transverse opening in the pipe even if insertion is accomplished under high flow and/or high pressure conditions.

Another object of the present invention is to provide an improved method of bypassing a section of pipe to be replaced or repaired without interruption of service, the method utilizing the improved stoppers of the present invention.

A further object of the present invention is the provision of a longitudinally split expandable and retractable metal sleeve with a gasket cover, the sleeve having an improved surface configuration for preventing damage to the sealing area thereon.

Ancillary to the immediately preceding object, it is a further object of the present invention to provide a stopper assembly which has longer life and which minimizes the danger of servicing pipe lines under high flow conditions and/or high pressures, especially when those pipe lines convey combustionable fluids such as gas or the like.

These and other objects, advantages and novel features of the present invention will become more apparent in the specification and claims taken in connection with the accompanying drawings in which:

FIGURE 1 a perspective view of a stopper assembly incorporating the improved expandable and retractable longitudinally split cylindrical sleeve of the present invention;

FIGURE 2 is a top plan view of the stopper assembly of FIGURE 1, the view also illustrates the stopper position in a pipe line shown in broken lines;

FIGURE 3 is a side elevational view, partly in longitudinal section of the stopper assembly illustrated in FIGURE 1; and FIGURE 4 is a schematic view illustrating equipment for accomplishing the method of the present invention and further illustrating the stopper assemblies of the invention in position within the pipe line on the upstream and downstream sides of the section of pipe to be repaired or replaced without interruption to service.

Referring now to the drawings wherein like characters or reference numerals represent like or similar parts, the pipe line stopper assembly of the present invention is generally designated by the numeral 10. With reference to FIGURE 2, the pipe line stopper assembly 10 is illustrated in position within transverse opening cutout of a pipe P shown in phantom lines. The particular construction of the pipe at this cutout portion is well known in the art and forms no part of the present invention. In this regard, see the prior United States patents of Koenig, No. 2,274,606, and Smith, No. 2,655,339, both assigned to the same assignee as the present invention.

The pipe line stopper assembly 10 includes a cylindrical sleeve 12 having a longitudinal slot 14, the sleeve 12 being constructed to a somewhat springy metal such as sheet metal, or the like. Secured to the interior of the sleeve 12 are a plurality of circumferentially spaced inwardly extending vanes 18 (FIGURE 4). The vanes 18 are of a somewhat triangular configuration having opposite inwardly converging inner edges 20 and 22 terminating at their innermost extremities at a flat longitudinal edge 24.

Positioned along the axis of the sleeve 12 is a jackscrew 30 having two sets of threads 32 and 34 of opposite directions. Threadably joined to the lower end 34 of the jackscrew 30 is a lower collar 36 and, threadably joined to the upper threaded end 32 of the jackscrew 30 is an upper collar 38. An expander wedge 40 is rigidly secured to the lower collar 36 by welding, or the like, whereas a second expander wedge 46 is likewise secured to the upper collar 38. The wedges 40 and 46 have opposite frusto-conical surfaces for respectively engaging the edges 20 and 22 of the vanes 18. As now will be apparent, rotation of the jackscrew 30 in one direction or the other will cause the wedges 40 and 46 to move opposite one another. If the jackscrew 30 is rotated in such a direction as to cause the wedges 40 and 46 to move towards one another, their outer surfaces cooperate with the surfaces 20 and 22 of the vanes 18 to expand the sleeve 12.

In order to positively contract the sleeve 12, each of the vanes is provided at its upper and lower ends with opposite inwardly converging fingers 52 and 62. The findgers 52 and 62 cooperate with complementary interior surfaces of the respective wedges 40 and 46.

The upper end of the jackscrew 30 is provided with noncircular end portion 94 that is adapted to cooperate with a noncircular end of an operating rod (not shown) of the stopper machine 100. Also, the upper end 76 of the collar 38 is provided with threads for engaging the flange of a manipulating tool (not shown) also forming part of the stopping machine 100. The aforementioned Patent 2,655,339 discloses a typical stopping machine 100.

It will be understood that the elements just previously described are substantially identical with those disclosed in my aforementioned United States Patent 3,130,951, and the stopper assembly 10 operates in a similar manner. While the above description of elements is not as detailed as in my aforementioned United States Patent 3,130,951, they are sufficient for the purpose of this description, and the subject matter of the said patent is incorporated herein by reference for any of the elements not described herein.

The improvement of the stopper assembly 10 of the present invention relates specifically to the longitudinally split cylindrical sleeve 12 and in more detail to the configuration of the exterior surface thereof. As best shown in FIGURE 2, the outer surface of the sleeve 12 is provided with a flexible cover 16 made of rubber or other suitable gasket material capable of engaging with the edges of the cutout portion of the pipe P so as to provide a seal therewith. Unlike the prior art, the flexible cover 16 does not extend around the entire circumference of the outer surface with longitudinal edges aligned with the longitudinal edges of the sleeve 12 but on the contrary the cover 16 only extends from the center of the outer surface of the sleeve 12 circumferentially about the same, the cover terminating short of the longitudinal edges 17 and 19 defining the slot 14. According to the present invention the flexible outer cover 16 of gasket material must extend greater than one-half of the circumference and it has been found preferable to extend the same about 210 degrees of the circumference so that it ends in longitudinal edges 23 and 25 respectively spaced from edges 17 and 19. On the outer surface of each of the outer portions 27 and 29 of the sleeve 12 outwardly of the ends of 23 and 25 respectively of the flexible cover 16 of gasket material there is provided an elongated metal wear strip 31. The wear strip 31 as shown in FIGURES 1, 2 and 3 extends longitudinally of the sleeve 12 and is spaced from the edges 17 and 19 of the same and is also spaced from the edges 23 and 25 of the cover 16. Preferably, the wear strips 31 are made of steel and have substantially the same thickness as the thickness of the flexible cover 16. They are secured to the sleeve 12 by means of plug welds 33, or the like.

When the stopper assembly 10 is inserted into the transverse opening in the pipe P and assuming that the pipe line P has high line flow conditions therein, the stoppper assembly 10 is oriented so that the slot or split 14 is downstream relative to the flow in the pipe line as indicated by the arrow F in FIGURE 2. The flow of fluid in the pipe line tends to urge the stopper assembly 10 in a downstream direction but since the sleeve 12 of the stopper is provided with wear strips 31, the wear strips 31 will bear against the downstream edges of the opening in the pipe line and, therefore, there is no danger of the flexible cover 16 being torn loose on these edges as it makes no initial contact therewith.

Referring now to FIGURE 4, there is disclosed a typical by-pass arrangement utilized for repairing or replacing a section of the pipe line P without interruption of service. In more detail, conventional stopper fittings 41 and 42 are welded or otherwise secured to the pipe line P upstream and downstream of the section S to be repaired or replaced. The conventional stopper machines 100 are then attached to the stopper fittings 41 and 42, the stopper machines 100 having therein built-in bypass means, pipe cutters and the stopper assemblies 10, as well as suitable valve means. A bypass line 102 extends from one stopper machine 100 to the other stopper machine 100 and a purge line having a purge fitting 104 with valves 106 and 108 on either side thereof is provided between the pipe line P and the bypass line 102.

By the novel method of the present invention, the downstream stopper assembly is inserted into the transverse opening in its retracted position and with its slot 14 facing in a downstream direction. Thus, the flow of the fluid within the pipe having a tendency to move the stopper assembly in a downstream direction does not cause the flexible cover 16 to be damaged as the wear strip 31 will slide on the edges of the opening rather than the cover 16 sliding thereon. Also, by having the slot 14 facing downstream, there is no tendency for the stopper assembly to be initially expanded by pressure of fluid getting into the same; and thus there is no chance of the cover 16 engaging the edges of the opening during insertion.

Before the downstream stopper assembly 10 is expanded into sealing engagement, the upstream stopper assembly 10 may be inserted into its opening in the pipe as the downstream stopper assembly 10 has provided at least a partial blockage of the flow of fluid in the pipe line and thus there is no danger of the upstream stopper assembly 10 having its cover torn even though its slot must face upstream. Once the downstream and upstream stopper assemblies 10 have been inserted into the pipe line P, then they can both be expanded into sealing engagement and the fluid in the pipe line, upon suitable actuation of valve means in the stopping machines 100, can flow through the slot in the upstream stopper assembly 10 into the upstream stopping machine 100 through the bypass pipe 102 down through the downstream stopping machine 100 and out through the slot in the downstream stopper assembly 10.

While in the above described method it has been indicated that the stopper assemblies described above in connection with the present invention are used, it will be appreciated that because of the novel method of inserting the downstream stopper assembly first and protecting its cover, in this particular case by the provision of the wear strip 31, the upstream stopper assembly 10 may have a cover entirely around the circumference of the sleeve as it will not be subjected to flow in the pipe line sufficient to cause damage thereto. The reason for this is that the downstream stopper having been placed into the pipe line first and even though in the retracted position causes sufficient blockage in the pipe line to reduce the high line flow condition and, thus, the upstream stopper assembly will not be subjected to a high line flow.

Once the repair or replacement of the section S has been made, the upstream stopper assembly 10 is first removed and then the downstream stopper assembly 10 may be retracted and removed. Of course, during the above operation, the necessity of purging the bypass line as well as the pipe line P between the stoppers is necessary and this is accomplished by use of the proper valve 106 or 108, any air being purged through the purge fitting 104.

The novel stopper assembly and method of use described and illustrated in the drawings fully and effectively accomplish the objects and advantages of the present invention. However, it will be understood that the foregoing specific embodiments have been shown and described only for the purpose of illustrating the principle of the invention and are subject to some changes and modifications without departing from such principles.

Therefore the terminology used throughout the specification is for the purpose of description and not limitation, the spirit and scope of the invention being described in the claims.

I claim:

1. In a cylindrical pipe stopper assembly for insertion into and having a minimum outer diameter less than a transverse circular opening through a pipe line, and adapted to be expanded into sealing engagement with the edges of the opening, an improvement in an expandable and retractable longitudinally split cylindrical sleeve comprising a flexible cover of gasket material on a portion of the outer surface of the cylindrical sleeve and circumferentially covering at least half of but less than all of the periphery of said sleeve, and protector means on another portion of the outer surface of said cylindrical sleeve for protecting said flexible cover of gasket material when the longitudinally split cylindrical sleeve is inserted into and removed from the opening of said pipe line.

2. A longitudinally split cylindrical sleeve as claimed in claim 1 in which said means includes at least one wear strip secured to the outer surface of said sleeve, said wear strip having a thickness substantially equal to the thickness of said covering.

3. A longitudinally split cylindrical sleeve as claimed in claim 2 in which said sleeve is metal and in which said wear strip is steel and is welded to said sleeve.

4. A longitudinally split cylindrical sleeve as claimed in claim 1 in which said means includes a wear strip on the outer surface of said sleeve extending adjacent to and parallel to each longitudinal edge of said sleeve, each said wear strip having a thickness substantially equal to the thickness of said cover of gasket material and each said wear strip being circumferentially spaced from an adjacent longitudinal edge of said gasket material.

5. A longitudinally split cylindrical sleeve as claimed in claim 4 in which said cover of gasket material circumferentially covers the outer surface of the sleeve in the order of 210°.

6. A longitudinally split cylindrical sleeve as claimed in claim 1 in which said cover of gasket material extends circumferentially from the center of the outer surface of the cylindrical sleeve towards and terminates short of the longitudinal edges of the same, and in which said means includes elongated steel strips secured to said sleeve adjacent each of the longitudinal edges of the sleeve, said strips being spaced from the ends of the cover gasket material and having substantially the same thickness as the cover of gasket material.

7. A longitudinally split cylindrical sleeve as claimed in claim 6 in which said strips are plug-welded to the surface of said sleeve.

8. A method of by-passing a section of pipe to be replaced or repaired without interruption of service, the method utilizing a pair of stopping machines attached to the pipe line upstream and downstream of the section and having built-in bypass means with a bypass line extending therebetween, and each stopping machine further having an expandable and retractable longitudinally split wedge stopper with a flexible gasket material covering at least a portion of the surface thereof for insertion into transverse opening in the pipe line, at least one of the stoppers having wear strips on its outer surface adjacent to the longitudinal split thereof, the steps of: inserting the longitudinally split wedge stopper having the wear strips into the transverse opening in the pipe line downstream of the section with the longitudinal split facing downstream and with the stopper retracted so as to provide partial blockage of flow in the pipe line upstream of the stopper; then inserting the second longitudinally spilt stopper into the transverse opening upstream of the section while the stopper is in the retracted position with its longitudinal split facing upstream; and then expanding the stoppers into sealing engagement with the edges of the respective openings to completely block off flow to the section while by-passing the flow through the bypass line around the section.

References Cited

UNITED STATES PATENTS

| | | | |
|---|---|---|---|
| 2,171,939 | 9/1939 | Larry et al. | 138—94 X |
| 2,237,476 | 4/1941 | Cline | 138—94 X |
| 2,510,513 | 6/1950 | Mueller et al. | 138—97 X |
| 2,696,966 | 12/1954 | Mueller et al. | 138—94 X |
| 2,740,606 | 4/1956 | Koenig | 137—317 X |
| 3,049,333 | 8/1962 | Wright et al. | 138—94 X |

LAVERNE D. GEIGER, *Primary Examiner.*

C. L. HOUCK, *Assistant Examiner.*